United States Patent

Iwatsuka et al.

Patent Number: 6,130,778
Date of Patent: Oct. 10, 2000

[54] COMPOSITE OPTICAL ELEMENT, OPTICAL ISOLATOR, OPTICAL CIRCULATOR, OPTICAL SWITCH AND PROCESS FOR PRODUCING THEM

[75] Inventors: Shinji Iwatsuka, Honjo; Kenjiro Hata, Nikaho-machi, both of Japan

[73] Assignee: TDK Corporation, Tokyo, Japan

[21] Appl. No.: 09/060,956

[22] Filed: Apr. 16, 1998

[30] Foreign Application Priority Data

Apr. 17, 1997 [JP] Japan ................................. 9-100250

[51] Int. Cl.$^7$ ........................................ G02B 5/30
[52] U.S. Cl. ..................... 359/497; 359/494; 359/500; 359/484
[58] Field of Search ................... 359/484, 494, 359/495, 497, 499, 500

[56] References Cited

U.S. PATENT DOCUMENTS

| | | |
|---|---|---|
| 5,033,830 | 7/1991 | Jameson . |
| 5,245,471 | 9/1993 | Iwatsuka et al. ............. 359/495 |
| 5,768,005 | 6/1998 | Cheng et al. ................. 359/484 |

FOREIGN PATENT DOCUMENTS

| | | |
|---|---|---|
| 63-55501 | 3/1988 | Japan . |
| 2-1562-5 | 6/1990 | Japan . |
| 4-307512 | 4/1991 | Japan . |
| 4-349421 | 12/1992 | Japan . |
| 5-181088 | 7/1993 | Japan . |
| 08050261 | 2/1996 | Japan . |
| 09258136 | 10/1997 | Japan . |

OTHER PUBLICATIONS

Shintaku, T. et al., "Polarisation–independent optical isolator based on anti–symmetric field conversion", *Electronics Letters*, vol. 33, No. 20, Sep. 25, 1997.

Primary Examiner—Darren Schuberg
Attorney, Agent, or Firm—Seidel, Gonda, Lavorgna & Monaco, PC

[57] ABSTRACT

A composite optical element comprises a first optical material and a second optical material joined to one plane of a third optical material. The first and second optical materials are of equal thickness and having ground surfaces flush with each other on both of their principal planes.

The first and second optical materials are fixedly joined to one another, and one of the principal planes of the two materials is ground. Then, the ground principal plane of the first and second optical materials is joined to the third optical material. Then, the other principal plane of the first and second optical materials is ground.

A preferred embodiment is an optical isolator wherein the first and second optical materials are birefringent materials and are joined to one side of a Faraday rotator having a Faraday rotational angle of approximately 45° and third and fourth birefringent materials are similarly joined to the other side of the rotator. Each of the principal planes of the first and second birefringent materials has a single flush ground surface. Each of the principal planes of the third and fourth birefringent materials has a single flush ground surface.

The first, second, third, and fourth birefringent materials are of the same material and have approximately the same thickness d, substantially satisfying the equation $2(n_o - n_e)d = (M + 1/2)\gamma$ where $n_o$ is the refractive index of the birefringent material to ordinary light, $n_e$ is the refractive index of the birefringent material to extraordinary light, M is an arbitrary integer, and $\gamma$ is the wavelength of the light.

13 Claims, 9 Drawing Sheets

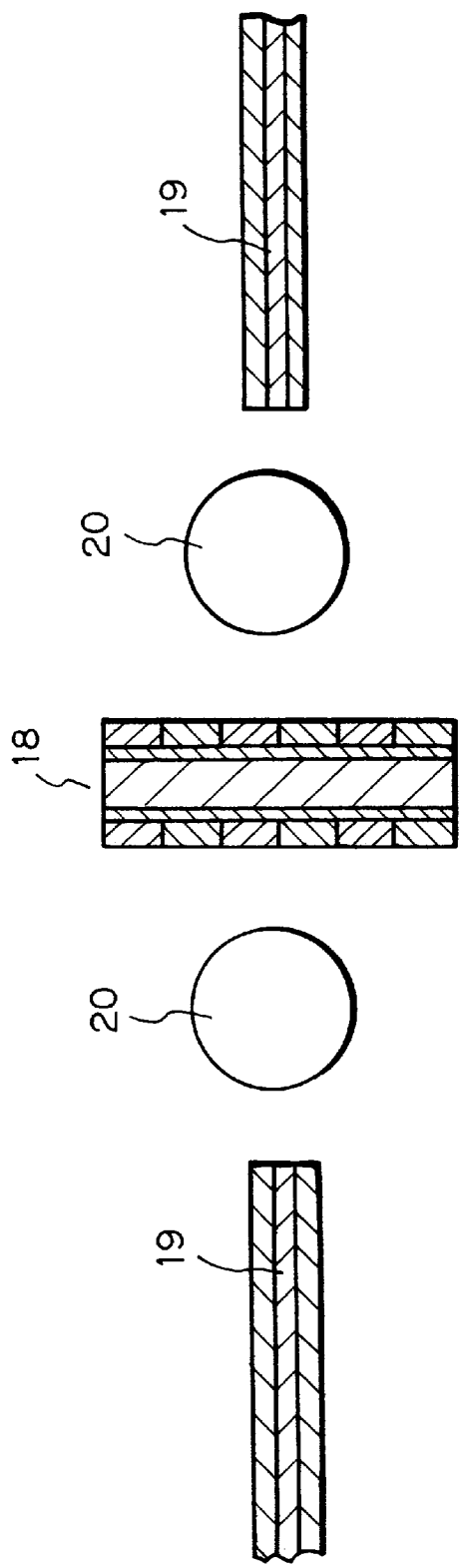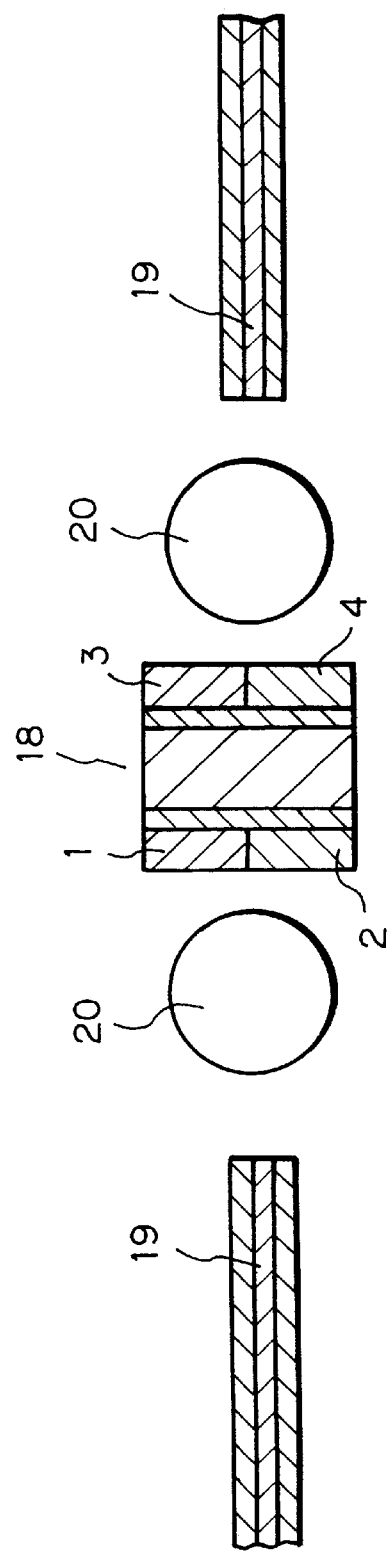

COMPOSITE OPTICAL ELEMENT, OPTICAL ISOLATOR, OPTICAL CIRCULATOR, OPTICAL SWITCH AND PROCESS FOR PRODUCING THEM

FIELD OF THE INVENTION

This invention relates to composite optical elements, optical isolators, optical circulators, and optical switches for applications in optical communications and measurements, and also to processes for producing the same.

BACKGROUND OF THE INVENTION

In Japanese Patent Application Kokai No. 5-181088 the present inventors proposed a novel, polarization-insensitive optical isolator comprising a Faraday rotator positioned between a pair of birefringent diffraction grating elements. Known birefringent diffraction grating elements useful for the optical isolator are as follows. They are all diffraction grating polarizers. Each element of the present invention by itself does not function as, but is technically equivalent to, a polarizer.

(1) The element according to Japanese Patent Application Kokai No. 63-55501; an element in which a diffraction grating is formed by subjection of lithium niobate to proton ion exchange. The element has a problem of high-cost manufacture because of the expensive single crystal substrate of lithium niobate for the grating. Another problem is that the difficulty of precise control of the optical path difference for polarization obstructs the fabrication of the elements in a stable way with good reproducibility.

(2) The element according to Japanese Patent Application Kokai No. 2-156205; a polarizer having a dielectric layer at the bottoms of grooves formed at regular intervals on the principal surface of an optically anisotropic crystal plate. The polarizer can be made at low cost, but the difficulties in accurately controlling the depth of grooves and the thickness of the dielectric layer render it impossible to control the optical path difference for polarization with high precision. Consequently, as with (1), stable production with good reproducibility has not been attained. In addition, rough bottom surface of the grooves can cause scattering, leading to deteriorated characteristics.

The present invention, therefore, aims at solving the afore-described problems and providing diffraction grating elements, especially birefringent diffraction grating elements, which permit easy control of the optical path length, production scheme, and designing, exhibit high performance stability with time, and have reduced thickness and also providing processes for producing them, and further providing optical isolators, optical circulators, and optical switches using those elements, and processes for producing them.

BRIEF SUMMARY OF THE INVENTION

The composite optical element in one aspect of the present invention comprises a first optical material and a second optical material joined to one plane of a third optical material, the first and second optical materials being the same in thickness and having ground principal planes flush with each other on both sides of them. To be more concrete, either the first or second optical material is a birefringent material. Alternatively, both of the first and second optical materials are birefringent and have functions as wave plates. The optical element has a broad range of applications as a component member for polarizers, diffraction gratings, optical isolators, optical circulators, and optical switches.

The composite optical element of the structure described is produced by the process according to of the invention. The process is a process for producing a composite optical element comprising the steps of:

forming a plurality of first grooves at predetermined intervals in a first optical material;

forming a plurality of second grooves at predetermined intervals in a second optical material;

bonding the first optical material having the first grooves and the second optical material having the second grooves together, with their grooves and lands staggered to fit each other, through an adhesive to provide a composite block;

grinding one side of the composite block to a thickness where both surfaces of the first and second optical materials are exposed;

bonding a third optical material, with a first plane on one side thereof, to the first ground surface of the composite block, through an adhesive; and grinding the side opposite to the first ground surface of the composite block to a given thickness where the surfaces of both the first and second optical materials are exposed.

The process of the invention facilitates the production control and designing as well as the control of the optical path lengths, and provides excellent composite optical elements.

A diffraction grating polarizer using a composite optical element according to the invention acts as a linear polarizer when the first optical element is made of a birefringent material and the second optical element is made of an isotropic material, and the component elements are combined so that a relation $(ne1-no1)d=(M+1/2)\gamma$, in which d is the overall thickness of the resulting element, $\gamma$ is the wavelength of incident light, and M is an integer, holds between the refractive indexes no1, ne1 of the first optical element with respect to two natural linear polarizations, or ordinary light and extraordinary light, and the refractive index n2 of the second optical element.

The composite optical element is further combined with a Faraday rotator to make a composite optical element for optical isolator according to the invention. Thus the composite optical element for optical isolator formed from the optical element of the invention is a composite optical element comprising a Faraday rotator having a Faraday rotation angle of approximately 45°, first and second birefringent materials joined to one side of the rotator, and third and fourth birefringent materials joined to the other side of the rotator, wherein:

the light that has been transmitted through the first birefringent material passes through the third birefringent material;

the light that has been transmitted through the second birefringent material passes through the fourth birefringent material;

the optical axis of the first birefringent material and that of the second birefringent material intersect orthogonally;

the optical axis of the third birefringent material and that of the fourth birefringent material intersect orthogonally;

the optical axis of the first birefringent material and that of the third birefringent material make an angle of about 45° with respect to each other;

the first and second birefringent materials have the same ground principal planes flush with each other on both sides of them;

the third and fourth birefringent materials have the same ground prinicpal planes flush with each other on both sides of them;

the first, second, third, and fourth birefringent materials are of the same material and have approximately the same thickness d, substantially satisfying the equation $$2(no-ne)d=(M+1/2)\lambda$$

where no is the refractive index of the birefringent material to ordinary light, ne is the refractive index of the birefringent material to extraordinary light, M is an arbitrary integer, and λ is the wavelength of the light.

A polarization-insensitive optical isolator according to the present invention that utilizes the composite optical element fabricated in accordance with the present invention comprises a first optical waveguide, a first lens, the said composite optical element, a second lens, and a second optical waveguide arranged in the order in which they have just been mentioned.

Light outgoing in the forward direction from the end of the first optical waveguide is converted by the first lens to parallel beams, the first light that has been transmitted through the first birefringent material passes through the third birefringent material, the second light that has been transmitted through the second birefringent material passes through the fourth birefringent material, and, after the passage through the third and fourth birefringent materials, the first light and second light, producing no optical path difference regardless of the optical path length difference, are combined by the second lens into the second optical waveguide;

while light outgoing in the reverse direction from the end of the second optical waveguide is converted by the second lens to parallel beams, the third light that has been transmitted through the third birefringent material passes through the first birefringent material, the fourth light that has been transmitted through the fourth birefringent material passes through the second birefringent material, and, after the passage through the first and second birefringent materials, the third light and fourth light produce a half-wave optical path difference regardless of polarization and are not combined by the first lens into the first optical waveguide.

A polarization-insensitive optical isolator according to the invention comprises:

a composite optical element according to the present invention inserted between a first single-mode optical waveguide and a second single-mode optical waveguide; and of the light rays outgoing in the forward direction from the end of the first single-mode optical waveguide, the first ray that has been transmitted through the first birefringent material passes through the third birefringent material, the second ray that has been transmitted through the second birefringent material passes through the fourth birefringent material, and, after the passage through the third and fourth birefringent materials, the first and second rays, producing no optical path difference regardless of polarization, are combined into the second single-mode optical waveguide;

while, of the rays outgoing in the reverse direction from the end of the second single-mode optical waveguide, the third ray that has been transmitted through the third birefringent material passes through the first birefringent material, the fourth ray that has been transmitted through the fourth birefringent material passes through the second birefringent material, and, after the passage through the first and second birefringent materials, the third and fourth rays produce a half-wave optical path difference regardless of polarization and are not combined into the first single-mode optical waveguide.

The composite optical element of the present invention can also be utilized to make up an optical circulator. An optical circulator according to the present invention is based on a waveguide type Mach-Zehnder interferometer circuit which comprises two optical waveguides for input and output, two 3-dB directional couplers, and two optical paths of equal length held between the two directional couplers, and:

a composite optical element according to the present invention is inserted between the two optical paths;

the first and third birefringent material regions being located in one of the optical paths and second and fourth birefringent material regions in the other optical path.

A process according to the present invention for producing the composite optical element according to the present invention comprises the steps of:

forming a plurality of first grooves at predetermined intervals in a first birefringent material;

forming a plurality of second grooves at predetermined intervals in a second birefringent material;

bonding the first birefringent material having the first grooves and the second birefringent material having the second grooves together, with their grooves and lands staggered to fit each other, through an adhesive to provide a first composite block;

grinding one side of the composite block to a thickness where both surfaces of the first and second birefringent materials are exposed, thereby forming a first ground surface;

bonding a Faraday rotator at one plane thereof to the first ground surface of the first composite block;

grinding the side opposite to the first ground surface of the composite block to a given thickness where the surfaces of both the first and second birefringent materials are exposed;

forming a plurality of third grooves at predetermined intervals in a third birefringent material;

forming a plurality of fourth grooves at predetermined intervals in a fourth birefringent material;

bonding the third birefringent material having the third grooves and the fourth birefringent material having the fourth grooves together, with their grooves and lands staggered to fit each other, through an adhesive to provide a second composite block;

grinding one side of the composite block to a thickness where both surfaces of the third and fourth birefringent materials are exposed, thereby forming a second ground surface;

bonding a Faraday rotator at the opposite plane thereof to the second ground surface of the second composite block; and grinding the side opposite to the second ground surface of the second composite block to a given thickness where the surfaces of both the third and fourth birefringent materials are exposed;

said first, second, third, and fourth birefringent materials being of the same material.

The composite optical elements according to the invention have broad applications for optical isolators, optical circulators, and optical switches.

The present invention provides a composite optical element in which a first optical material and a second optical material are joined to one plane of a third optical material, the first and second optical materials being the same in thickness and having ground surfaces flush with each other on the same principal planes thereof. The invention also provides the use of the composite optical element in fabricating various devices such as polarizers, optical isolators, optical circulators, and optical switches.

The invention further provides a process for producing a composite optical element comprising the steps of:

forming a plurality of first grooves at predetermined intervals in a first optical material;

forming a plurality of second grooves at predetermined intervals in a second optical material;

bonding the first optical material having the first grooves and the second optical material having the second grooves together, with their grooves and lands staggered to fit each other, through an adhesive to provide a composite block;

grinding one side of the composite block to a thickness where both surfaces of the first and second optical materials are exposed;

bonding a third optical material, with a first plane on one side thereof, to the first ground surface of the composite block, through an adhesive; and grinding the side opposite to the first ground surface of the composite block to a given thickness where the surfaces of both the first and second optical materials are exposed. The invention still further provides the use of the process in making various devices such as polarizers, optical isolators, optical circulators, and optical switches. The process facilitates the manufacture of composite optical elements and precision control of the process, rendering it possible to enhance the efficiency of production and the of the composite optical elements while reducing the cost of the elements and the optical devices utilizing the same.

Now, for a better understanding of the invention, the optical isolator according to the present invention that uses two composite optical elements according to the present invention will be explained along with the principle of operation of the isolator.

Referring to FIG. 1, the element is constructed so that the light that has passed through the first birefringent material travels through the Faraday rotator and thence the third birefringent material while the light that has passed through the second birefringent material proceeds through the Faraday rotator and thence the fourth birefringent material. The optical axes of the first and second birefringent materials intersect orthogonally and likewise the axes of the third and fourth birefringent materials intersect orthogonally. The optical axes of the first and third birefringent materials make an angle of approximately 45° with respect to each other.

1) When light of linear polarization parallel to the optical axis of the first birefringent material is incident in the forward direction This linearly polarized light is transmitted as extraordinary light (refractive index ne) through the first birefringent material. As it further passes through the Faraday rotator the plane of polarization rotates 45°, and then the light passes as ordinary light (refractive index no) through the third birefringent material. Meanwhile the sane incident light is transmitted as ordinary light (refractive index no) through the second birefringent material. As it further passes through the Faraday rotator the plane of polarization rotates 45°, and then the light passes as extraordinary light (refractive index ne) through the fourth birefringent material. The optical path length for the passage of light through the first and third birefringent materials is (ne+no)d. Likewise the optical path length for passage through the second and fourth birefringent materials is (no+ne)d. Since the two optical path lengths are equal, the light emerges from the optical isolator straight forward without diffraction.

2) When light of linear polarization perpendicular to the optical axis of the first birefringent material is incident in the forward direction This linearly polarized light passes as ordinary light (refractive index no) through the first birefringent material, as extraordinary light (refractive index ne) through the third birefringent material, as extraordinary light (refractive index ne) through the second birefringent material, and as ordinary light (refractive index no) through the fourth birefringent material. The optical path length for the passage of light through the first and third birefringent materials is (no+ne)d, and that for the passage through the second and fourth birefringent materials is also (ne+no)d. The equal length of the two optical paths allows the light to travel straightly forward without diffraction.

Thus light in the forward direction proceeds straight forward regardless of polarization.

The two optical path lengths for linear polarization in 1) and 2) above being equal as (no+ne)d, it is possible to obtain an ideal optical isolator free from dispersion of polarization.

3) When light of linear polarization parallel to the optical axis of the third birefringent material is incident in the reverse direction This linearly polarized light passes as extraordinary light (refractive index ne) through the third birefringent material, as extraordinary light (refractive index ne) through the first birefringent material, as ordinary light (refractive index no) through the fourth birefringent material, and as ordinary light (refractive index no) through the second birefringent material. The optical path length for the passage of light through the first and third birefringent materials is (no+no)d, and that for the passage through the second and fourth birefringent materials is likewise (ne+ne)d. The light diffracts when the optical path difference is set to a half wave, or to substantially satisfy the equation $$2(no-ne)d=(M+1/2)\lambda \quad (1)$$

where M is an arbitrary integer and $\lambda$ is the wavelength of the light.

4) When light of linear polarization perpendicular to the optical axis of the third birefringent material is incident in the reverse direction This linearly polarized light passes as ordinary light (refractive index no) through the third birefringent material, as ordinary light (refractive index no) through the first birefringent material, as extraordinary light (refractive index ne) through the second birefringent material, and as extraordinary light (refractive index ne) through the fourth birefringent material. The optical path length for the passage of light through the first and third birefringent materials is (ne+ne)d, and that for the passage through the second and fourth birefringent materials is likewise (no+no)d. The light diffracts when the optical path difference is set to a half wave, or to substantially satisfy the equation $$2(no-ne)d=(M+1/2)\lambda \quad (1)$$

where M is an arbitrary integer and $\lambda$ is the wavelength of the light.

As described above, the optical isolator according to the present invention functions as a polarization-insensitive optical isolator, since it allows light in the forward direction to proceed straight without dependence upon polarization and diffracts light in the reverse direction again without dependence upon polarization.

In the optical isolator of the invention the first to the fourth birefringent materials are all of the same material, and the precision of their optical path difference is dictated by the precision of the thickness d. Under the invention, both surfaces of the first and second birefringent materials and both surfaces of the third and fourth birefringent materials are ground so as to ensure high precision of the thickness d of the regions between the two ground surfaces.

For the optical isolator of the invention the refractive indexes no and ne of the birefringent materials can be precisely measured before fabrication, and therefore the isolator is easy to design (including the setting of the thickness d) and the yield of the products is improved.

Since quartz, rutile, and other single crystal materials may be employed as the birefringent materials, outstanding resistance to environments is attained, and there is little possibility of the resulting optical isolator being deteriorated in performance due to changes in the refractive indexes with time.

BRIEF EXPLANATION OF THE DRAWINGS

FIG. 14 An explanatory diagram of an optical isolator according to the present invention.

FIG. 15 An explanatory diagram of another optical isolator according to the present invention.

DETAILED DESCRIPTION OF THE DRAWING

Construction of an optical isolator

The construction of an optical isolator according to the present invention will now be explained in connection with the sequence of its manufacturing steps.

Figure 1:
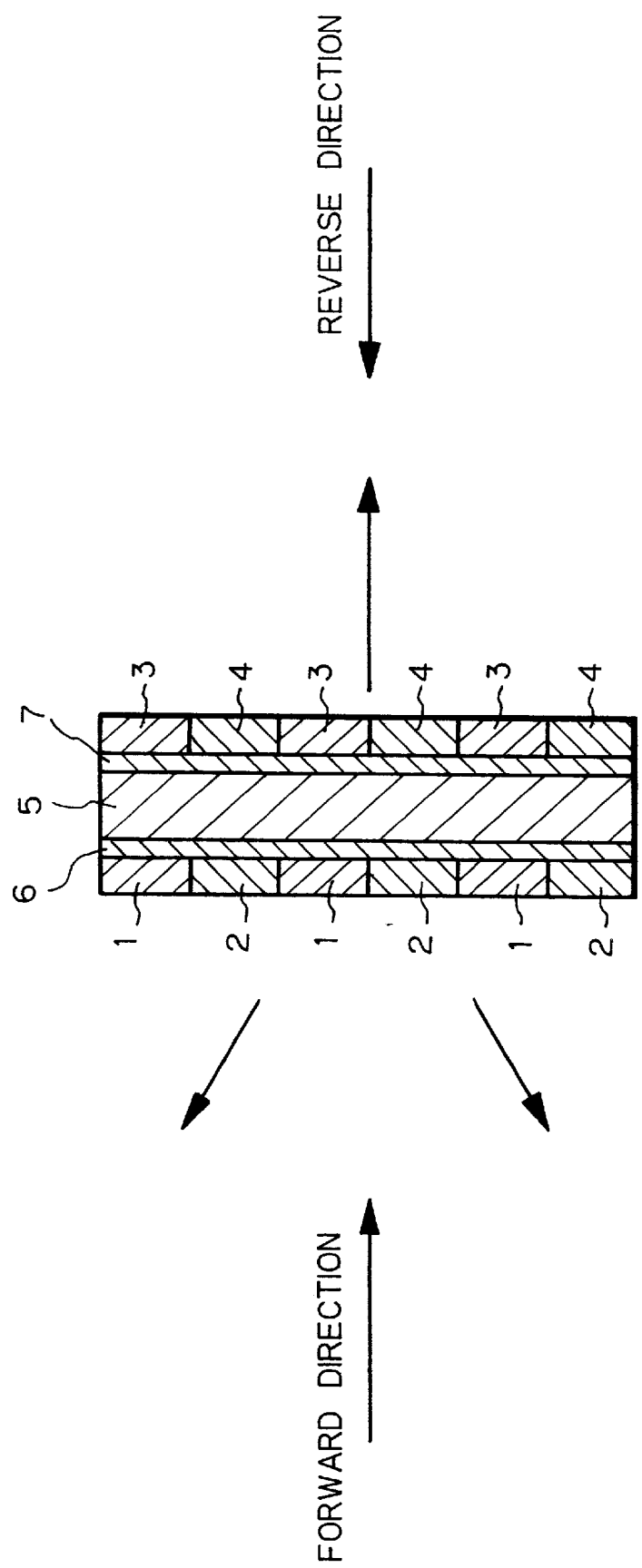
FIG. 1 An explanatory diagram of an optical isolator according to the present invention.
Figure 2:
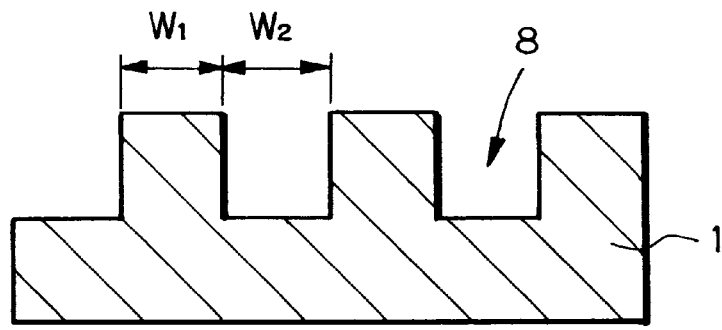
FIG. 2 A cross sectional view illustrating Step 1 of an exemplary process for manufacturing the optical isolator of the invention.

Step 1:

A piece of a first birefringent material 1 is provided and, as illustrated in FIG. 2, a plurality of first grooves 8 having a width w2 each are formed at intervals w1 in the birefringent material 1 by means of a dicing saw, peripheral cutter or the like. Here w1 preferably is made slightly narrower than w2. The depth of the first grooves 8 is fixed to be greater than the eventual thickness d of the birefringent material 1.

Figure 3:
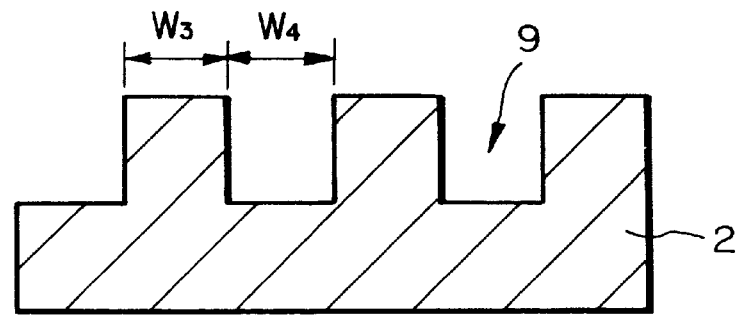
FIG. 3 A cross sectional view illustrating Step 2 of an exemplary process for manufacturing the optical isolator of the invention.

Step 2:

A piece of a second birefringent material 2 of the same material as the first birefringent material 1 is provided and, as shown in FIG. 3, a plurality of second grooves 9 having a width w4 each are formed at intervals w3 in the second birefringent material 2 by means of a dicing saw, peripheral cutter or the like. Preferably, w3 and w4 are made substantially equal to w1 and w2, respectively, w3 being made slightly narrower than w4. The depth of the second grooves 9 is fixed to be greater than the eventual thickness d of the second birefringent material 2.

Figure 4:
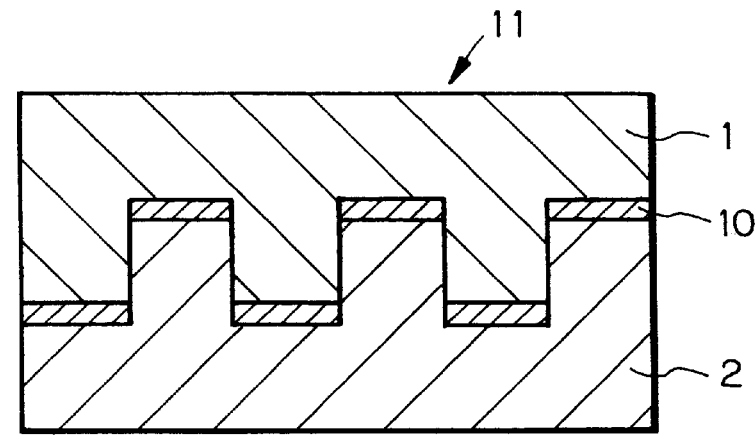
FIG. 4 A cross sectional view illustrating Step 3 of an exemplary process for manufacturing the optical isolator of the invention.

Step 3:

As depicted in FIG. 4, the parts of first birefringent material 1 made by Step 1 (FIG. 2) and the second birefringent material 2 made by Step 2 (FIG. 3) are bonded together, with their grooves and lands staggered to fit each other, through an adhesive layer 10, whereby a composite block 11 is formed. The adhesive may be an organic adhesive, low-melting glass or the like which is clear in use with the wavelength applied.

Figure 5:
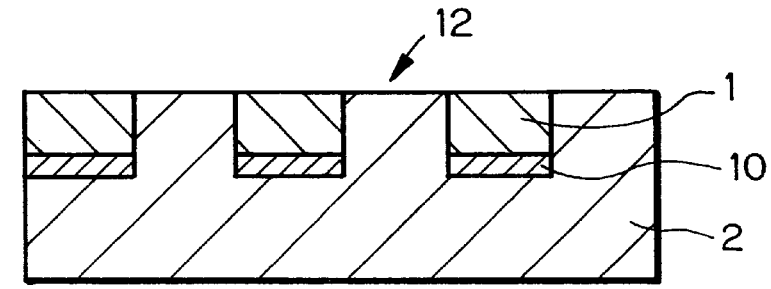
FIG. 5 A cross sectional view illustrating Step 4 of an exemplary process for manufacturing the optical isolator of the invention.

Step 4:

One side of the composite block 11 is ground, as in FIG. 5, until a first ground surface 12 is formed where an alternate arrangement of the portions of the first birefringent material 1 and the second birefringent material 2 emerges. While FIG. 5 shows the first birefringent material 1 ground to that level, it is not objectionable to grind the second birefringent material 2 instead.

Figure 6:
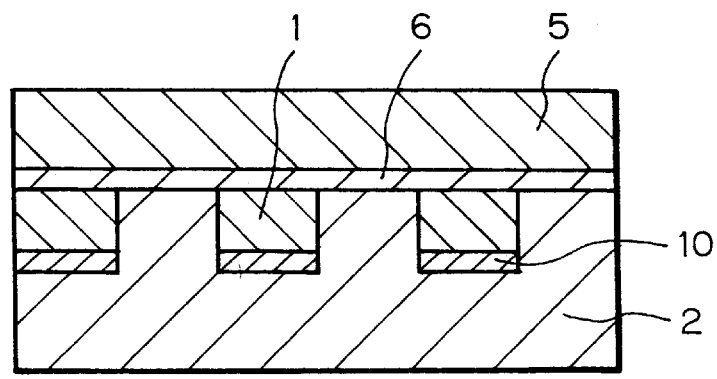
FIG. 6 A cross sectional view illustrating Step 5 of an exemplary process for manufacturing the optical isolator of the invention.

Step 5:

As FIG. 6 shows, the first polished surface 12 of the composite block obtained in Step 4 and a Faraday rotator 5 are joined together, with an adhesive layer 6 interposed between the two. The adhesive may be an organic adhesive, low-melting glass or the like which is clear in use with the service wavelength. The adhesive layer 6 extends uniformly on both the first birefringent material 1 and the second birefringent material 2. Thus, regardless of any variation in the refractive index of the adhesive filler, the optical path difference between the two material portions remains unchanged, and hence no deterioration is caused in the optical isolator performance.

Figure 7:
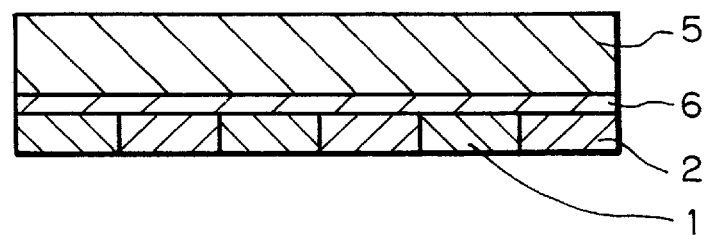
FIG. 7 A cross sectional view illustrating Step 6 of an exemplary process for manufacturing the optical isolator of the invention.

Step 6:

As shown in FIG. 7, the opposite side, or the side not ground in Step 4, of the block is now ground to a thickness d that substantially satisfies the equation $$2(no-ne)d=(M+1/2)\lambda \quad (1)$$

where M is an arbitrary integer and λ is the wavelength of the light.

The thickness d of the block portion where the birefringent materials 1 and 2 are alternately arranged is made less than the depths of the first grooves 6 (FIG. 2) and the second grooves 7 (FIG. 3). Grinding to the thickness d, therefore, exposes both the birefringent materials 1 and 2.

Figure 8:
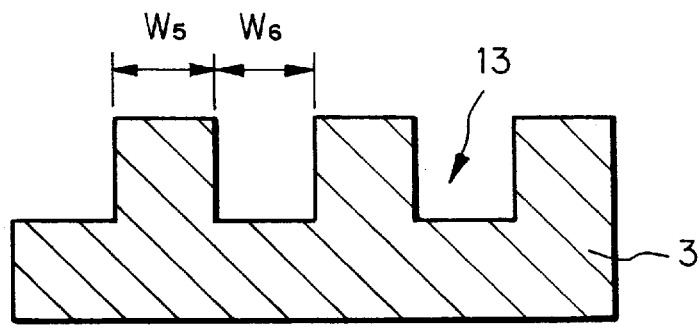
FIG. 8 A cross sectional view illustrating Step 7 of an exemplary process for manufacturing the optical isolator of the invention.

Step 7:

Similarly to Steps 1 and 2, a third birefringent material 3 of the same material as the first birefringent material 1 was provided. As illustrated in FIG. 8, a plurality of third grooves 13 having a width w6 each are formed at intervals w5 in the birefringent material 3 by means of a dicing saw, peripheral cutter or the like. Here w5 preferably is made slightly narrower than w6. The depth of the third grooves 13 is fixed to be greater than the eventual thickness d of the birefringent material 3.

Figure 9:
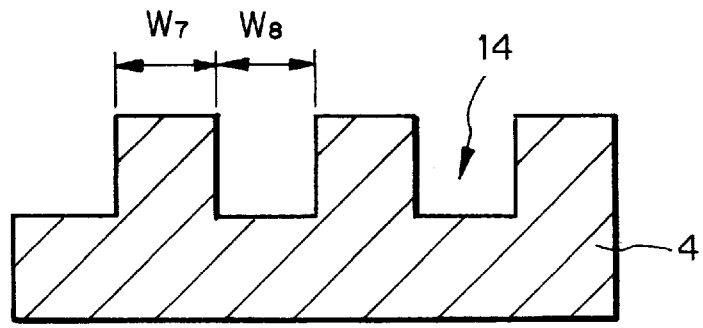
FIG. 9 A cross sectional view illustrating Step 8 of an exemplary process for manufacturing the optical isolator of the invention.

Step 8:

As in Steps 1 and 2 a piece of a fourth birefringent material 4 of the same material as the first birefringent material 1 is provided and, as shown in FIG. 9, a plurality of fourth grooves 14 having a width w8 each are formed at intervals w7 in the fourth birefringent material 4 by means of a dicing saw, peripheral cutter or the like. Preferably, w7 and w8 are made substantially equal to w5 and w6, respectively, w7 being made slightly narrower than w8. The depth of the fourth grooves 14 is fixed to be greater than the eventual thickness d of the fourth birefringent material 4.

Figure 10:
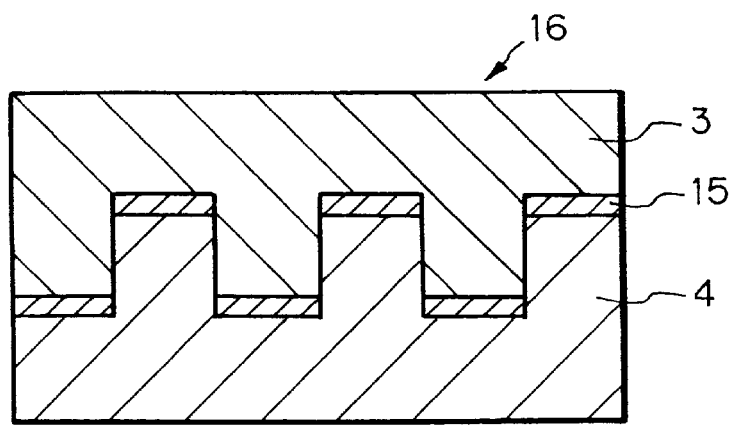
FIG. 10 A cross sectional view illustrating Step 9 of an exemplary process for manufacturing the optical isolator of the invention.

Step 9:

As depicted in FIG. 10, the parts of third birefringent material 3 made by Step 7 (FIG. 8) and the fourth birefringent material 4 made by Step 8 (FIG. 9) are bonded together, with their grooves and lands staggered to fit each other, through an adhesive layer 15, and a composite block 16 is formed. The adhesive may be an organic adhesive, low-melting glass or the like which is clear in use with the wavelength applied.

Figure 11:
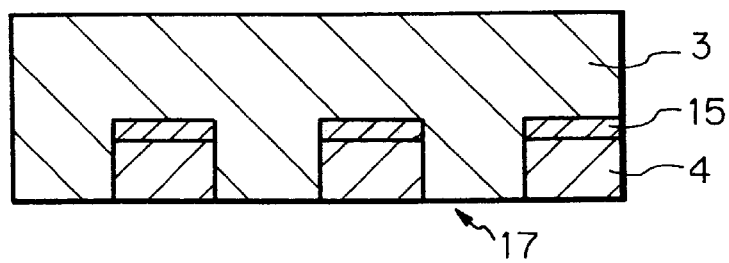
FIG. 11 A cross sectional view illustrating Step 10 of an exemplary process for manufacturing the optical isolator of the invention.

Step 10:

One side of the composite block 16 is ground, as shown in FIG. 11, to expose a second ground surface 17 where the portions of the third birefringent material 3 and the fourth birefringent material 4 are alternately arranged. While FIG. 11 shows the fourth birefringent material 4 ground to that level, the third birefringent material 3 may be ground instead.

Figure 12:
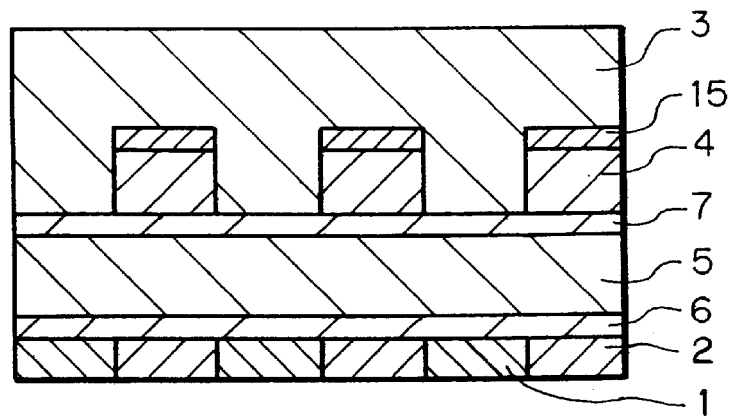
FIG. 12 A cross sectional view illustrating Step 11 of an exemplary process for manufacturing the optical isolator of the invention.

Step 11:

As FIG. 12 shows, the second ground surface 17 of the composite block obtained in Step 10 and a Faraday rotator 3 are joined together, with an adhesive layer 7 interposed between the two. Here, as in FIG. 12, the first and third birefringent materials and the second and fourth birefringent materials are adjusted in position for exact alignment. The adhesive may be an organic adhesive, low-melting glass or the like which is clear in use with the service wavelength. The adhesive layer 7 extends uniformly over both the third birefringent material 3 and the second birefringent material 4. Thus, despite any variation in the refractive index of the adhesive filler, the optical path difference between the two material portions remains unchanged and there occurs no deterioration in the optical isolator performance.

Figure 13:
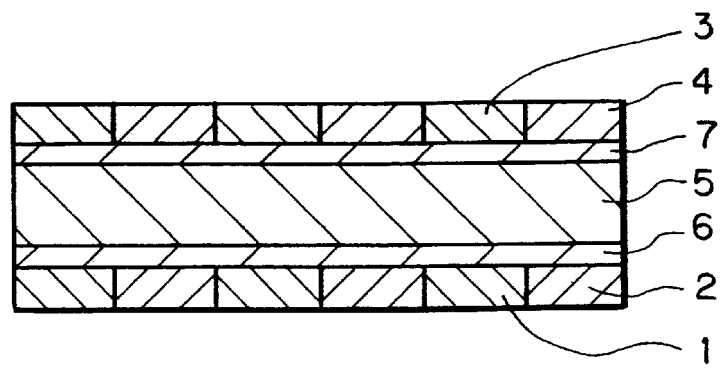
FIG. 13 A cross sectional view illustrating Step 12 of an exemplary process for manufacturing the optical isolator of the invention.

Step 12:

As in FIG. 13, the opposite side, or the side not ground in Step 10, of the block is now ground to a thickness d that substantially satisfies the equation $$2(no-ne)d=(M+1/2)\lambda \quad (1)$$

where M is an arbitrary integer and A is the wavelength of the light.

The thickness d of the block portion where the birefringent materials 3 and 4 are alternately arranged is made less than the depths of the third grooves 13 (FIG. 8) and the fourth grooves 14 (FIG. 9). Grinding to the thickness d, therefore, exposes both the birefringent materials 3 and 4.

The manufacturing method of the invention eventually removes by grinding whatever may have been left at the bottom of the recesses that are formed by grooving. Hence there is no problem of scattering loss due to the roughness of the bottom surface. On the other hand, it is advisable that the side walls of the grooves, i.e., the boundary faces of the first and second birefringent materials and the third and fourth birefringent materials, should be machined to minimize the surface roughness.

Although not shown in FIGS. 4–7 and 10–13, adhesive may be interposed between the adjoining faces, or along the boundaries. In that case the adhesive is desired to have a refractive index as close to the refractive of the birefringent materials.

Steps 5 and 11 may be followed concurrently rather than separately. That is to say, it is alternatively possible to join both the composite blocks 12 and 17 simultaneously to the both sides of the Faraday rotator and grind the both outer sides of the assembly.

Performance of the optical isolator

The optical isolator 18 thus obtained performs as a polarization-insensitive optical isolator. It allows all the rays in the forward direction to proceed straight while diffracting the rays in the reverse direction.

Optical materials for composite optical elements

The birefringent materials that may be used for the composite optical elements of optical isolators according to the present invention are any transparent birefringent materials. Typical of them are quartz, calcite, sapphire, ADP, KDP, and rutile. Its comparatively very low price and ease of machining make quartz particularly suitable as a birefringent material for the present invention.

The Faraday rotator may be of any kind in use for that application, such as Bi-substituted rare-earth iron garnet or YIG.

The sequence of process steps illustrated in FIGS. 8 to 13 is the repetition of the same basic sequence of steps shown in FIGS. 2 to 7. The invention is intended to cover all the methods that make use of such basic procedure, all the composite optical elements thereby produced, and all the optical devices utilizing the elements.

Working examples

An embodiment of the invention in which crosscut quartz plates were used as the birefringent material will now be explained with concrete numerical values. At a wavelength of 1550 nm the quartz showed an ordinary-light refractive index no=1.52781 and an extraordinary-light refractive index ne=1.53630. The thickness of the quartz plates before being machined was 600 μm. As a Faraday rotator, a Bi-substituted rare-earth iron garnet having a thickness of 400 µm was employed.

Steps 1 and 2:

Two quartz plates, the first and second, were formed with grooves with w1, w2, w3, and w4 of about 100 µm each and a thickness of about 300 µm.

Step 3:

The first and second quartz plates were joined using an optical adhesive to form a composite block.

Step 5:

The composite block was ground from the outer side of the first quartz plate to a depth of about 400 µm so that both the first and second quartz plate portions were exposed.

Step 5:

A Faraday rotator was joined to the ground surface of the composite block with an optical adhesive.

Step 6:

The composite block joined with the Faraday rotator was ground from the outer side of the second quartz plate until the combined thickness of the first and second quartz plates was 46 µm.

Steps 7 and 8:

Two quartz plates, the third and fourth, were formed with grooves with w5, w6, w7, and w8 of about 100 µm each and a thickness of about 300 µm.

Step 9:

The third and fourth quartz plates were joined using an optical adhesive to form a composite block.

Step 10:

The composite block was ground from the outer side of the fourth quartz plate to a depth of about 400 µm so that both the third and fourth quartz plate portions were exposed.

Step 11:

The Faraday rotator was joined to the ground surface of the composite block with an optical adhesive.

Step 12:

The composite block joined with the Faraday rotator was ground from the outer side of the third quartz plate until the combined thickness of the third and fourth quartz plates was 46 µm.

Characteristics of the optical isolator 18 so made were determined by placing it in the center of a parallel beam system which, as shown in FIG. 14, comprised an aligned pair of single-mode optical fibers 19, 19 and a pair of lenses 20, 20 each held between the block and one of the fibers. Performance of the isolator as a polarization-insensitive optical isolator with no polarization dispersion was confirmed. This optical isolator was very thin, with an overall thickness of only 600 µm.

Figure 16:
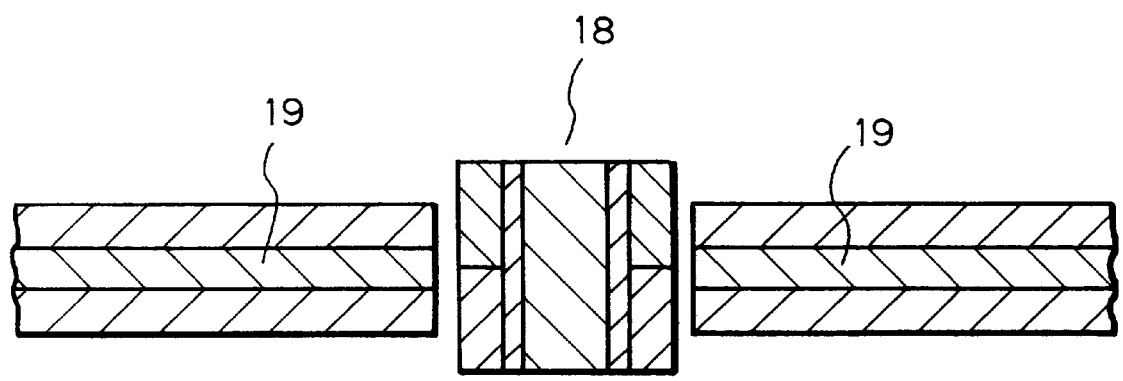
FIG. 16 An explanatory diagram of still another optical isolator according to the present invention.

It is not essential that the first and second birefringent material portions be arranged alternately; as shown in FIG. 15, only two sets of regions 1, 2 and 3, 4 (1 and 3 being located exactly opposite to each other as are 2 and 4) produce the same performance. The element shown in FIG. 15 lends itself greatly to quantity production, because a number of such elements can be simply produced by cutting the element obtained in the above example to given dimensions. It is also possible to locate this optical isolator 18, as in FIG. 16, between two aligned optical fibers or optical waveguides 19, 19. The arrangement dispenses with lenses and renders it possible to realize a low-cost, compact optical isolator. In FIG. 16 the opposing ends of the optical fibers or waveguides 19, 19 may be enlarged to maximize the spot size of the outgoing beam and thereby restrict the spread of outgoing light and attain improved optical isolator characteristics.

While M in Eq. (1) in the above example was set to M=−1, it is usually desirable to set it to M=0 when no>ne or M=−1 when no<ne. Setting this way broadens the wave range in which the optical isolator performs to the maximum.

Figure 17:
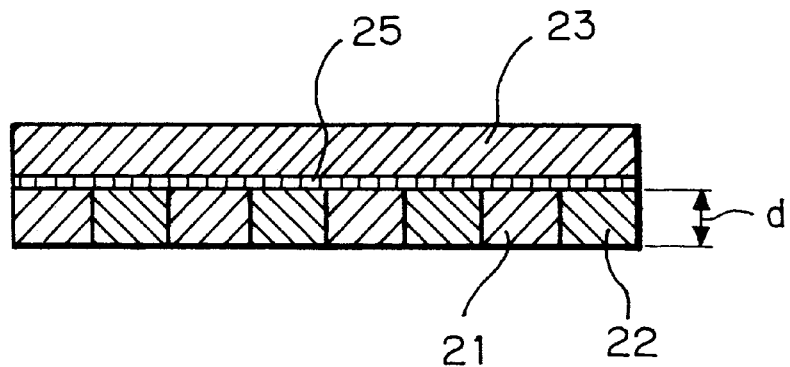
FIG. 17 A cross sectional view of a polarizer according to the present invention.

FIG. 17 shows an example of diffraction grating polarizer that uses a composite optical element made in the same way as that depicted in FIGS. 2 to 7. Small pieces of a first optical element 21 made of a birefringent material and a second optical element 22 made of an isotropic material are arranged alternately at given intervals and joined together to a third optical material, e.g., an isotropic material 23, with an adhesive 25. The elements are combined so that a relation $(ne1-no1)d=(M+1/2)\lambda$, in which d is the overall thickness of the resulting element, $\lambda$ is the wavelength of incident light, and M is an integer, holds between the refractive indexes no1, ne1 of the first optical element 21 with respect to two natural linear polarizations, or ordinary light and extraordinary light, and the refractive index n2 of the second optical element 22. The product acts as a linear polarizer.

Figure 18:
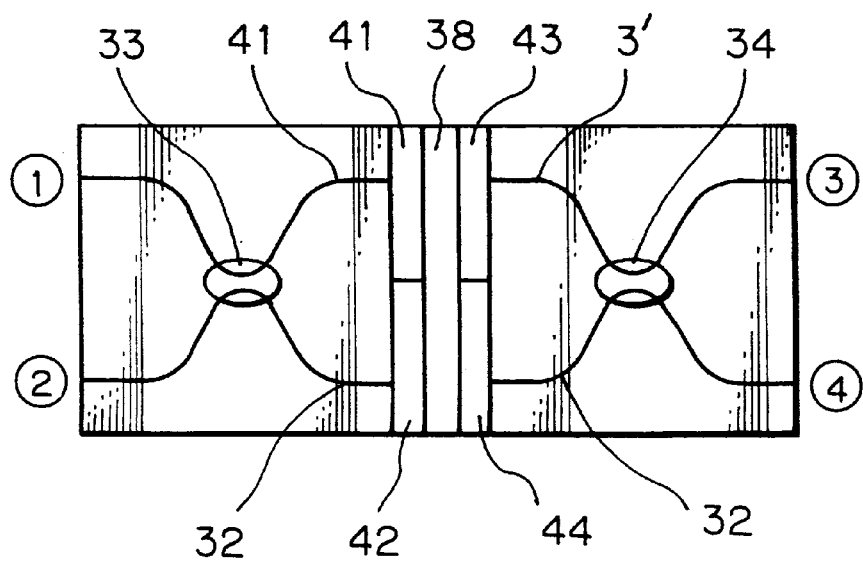
FIG. 18 A schematic diagram of an optical circulator embodying the present invention.

FIG. 18 shows example in which a composite optical element produced by the method of FIGS. 2 through 13 is utilized as an optical circulator. An optical circulator based on a waveguide type Mach-Zehnder interferometer circuit which comprises two optical waveguides for input and output, two 3-dB directional couplers, and two optical paths of equal length held between the two directional couplers, is described, e.g., in Japanese Patent Application Kokai No. 8-50261 (which is cited as part hereof). The composite optical element of the invention can be used in constructing such an optical circulator.

Referring to FIG. 18, there is shown a composite optical element inserted in an optical circulator based on a waveguide type Mach-Zehnder interferometer circuit which comprises two optical waveguides 31, 32 for input and output, two 3-dB directional couplers 33, 34, and two optical paths 31, 32 of equal length held between the two directional couplers. The composite optical element comprises a Faraday rotator 39, first and second birefringent materials 41, 43 joined to one side of the rotator, and third and fourth birefringent materials 43, 44 joined to the other side of the rotator. Regions of the first and third birefringent materials 41, 42 are located in one optical path and regions of the second and fourth birefringent materials 42, 44 in the other optical path. The optical axis of the first birefringent material 41 and that of the second birefringent material 42 are orthogonal to each other, and the optical axes of the third and fourth birefringent materials 43, 44 are orthogonal to each other, the optical axis of the first birefringent material 41 making an angle of about 45° with the optical axis of the third birefringent material 43.

The arrangement results in a given optical path difference between the two optical paths, with the consequence that the rays incident on ports (1), (2), (3), and (4) emerge at (3), (4), (2), and (1), respectively.

Figure 19:
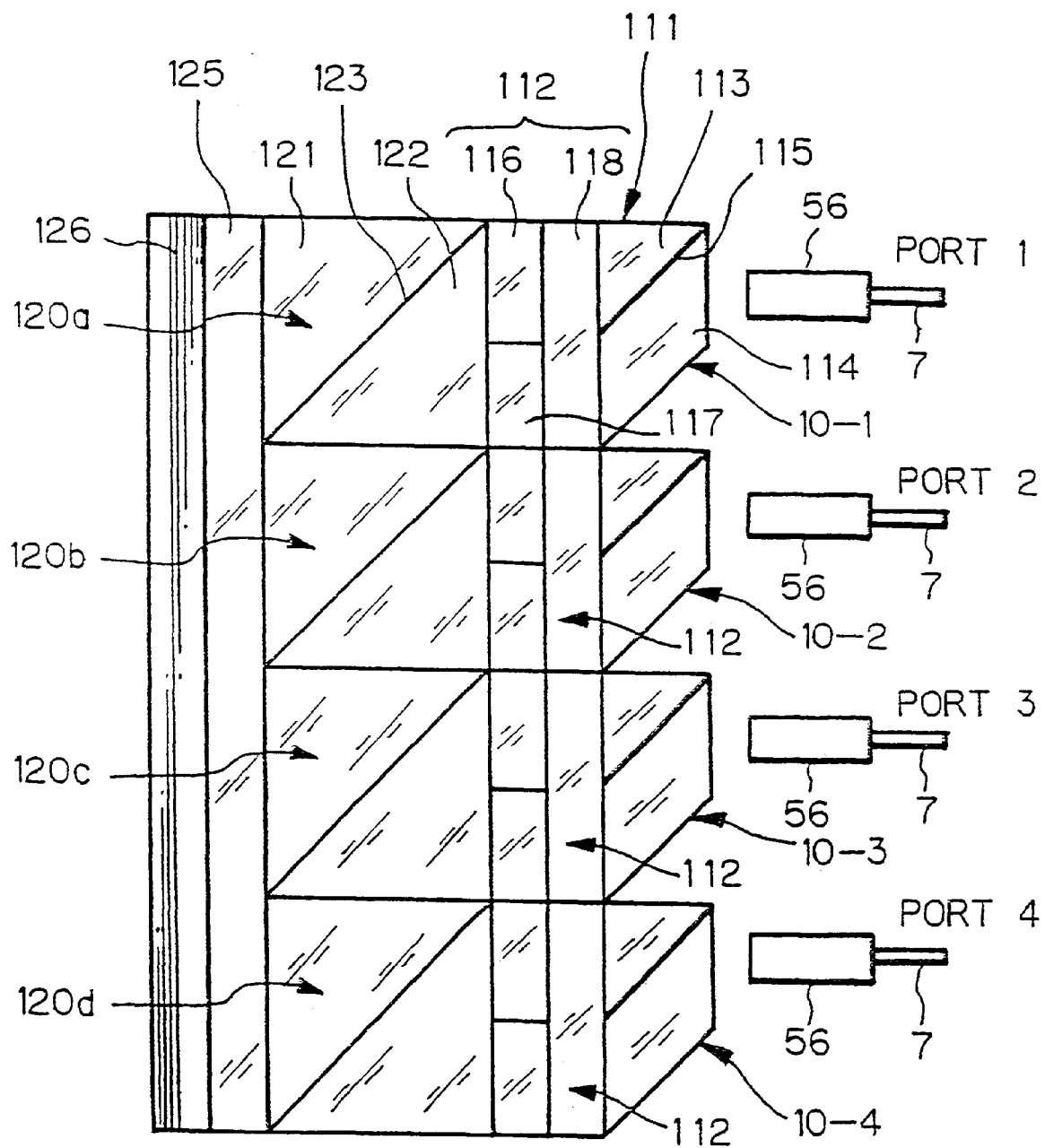
FIG. 19 A diagram illustrating an optical switch and an optical circulator in another embodiment of the invention.
Figure 20:
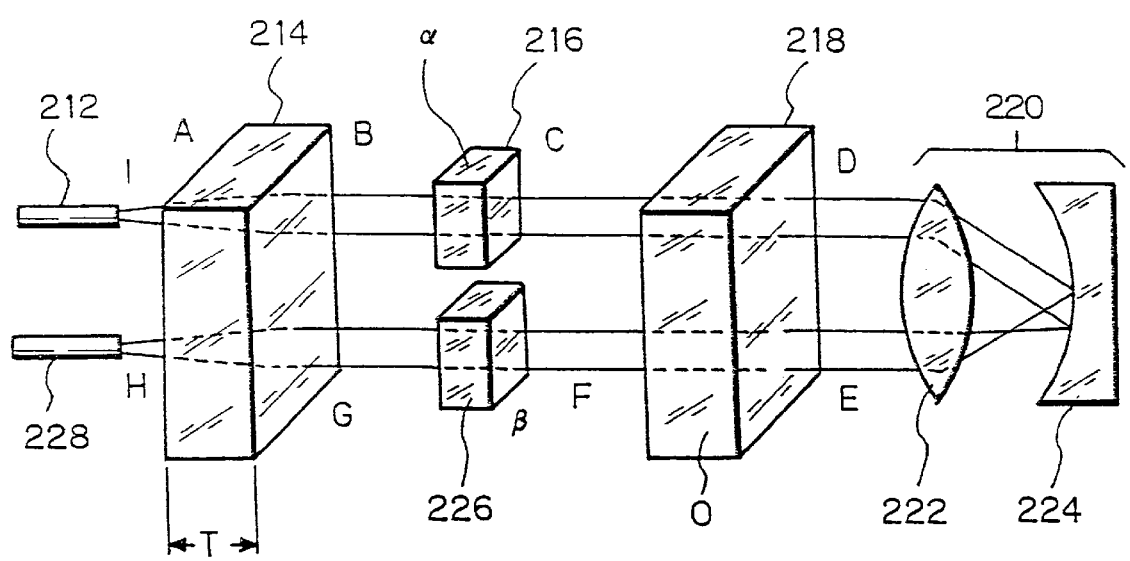
FIG. 20 An exploded view of another embodiment of the optical isolator of the invention.

Referring to FIGS. 19 and 20, a composite optical element of the invention in which the first and second component optical elements have wave plate functions may be applied to an optical isolator, optical circulator, or optical switch. FIG. 19 illustrates how the invention is applied to an optical circulator and optical switch described in Japanese Patent Application Kokai No. 9-258136 (which is cited as part hereof). Referring to the figure, there are provided a plurality (usually numbering n) of terminal units 10-1, 10-2, 10-3, and 10-4, each comprising, in an arrangement as shown: a first composite polarizing beam splitter 111 which consists of a polarization separating film 115 integrally sandwiched between a 45° triangular prism 113 and a parallelogrammic prism 114 whose narrower angle is 45° and a nonreciprocal part 112 built in accordance with the present invention which consists of a first birefringent plate 116 as a half-wave plate, a second birefringent plate as a half-wave plate, and a 45° Faraday rotator, whereby the direction of polarization is rotated 90° as linearly polarized light passes from one plane to another and the direction of polarization is not rotated as the light travels reversely. Input-output ports 1–4 are located adjacent the first composite polarizing beam splitters of these terminal units. On the other sides of the units ending with the nonreciprocal parts 112, second composite polarizing beam splitters 120a–120d are arranged as shown, each consisting of a polarization separating film 123 integrally sandwiched between two triangular prisms 121, 122. The opposite sides of the second composite polarizing beam splitters are connected, as shown, to a polarization rotating means 125 that rotates the plane of polarization 90° by reciprocating movement and a reflector means 126. An optical circulator is thus constructed.

An optical switch can be built up by adding a means of applying a variable magnetic field to the nonreciprocal parts 112.

In another embodiment, the composite optical element of the invention may be used in a polarization-insensitive isolator disclosed in U.S. Pat. No. 5,033,830 (which is cited as part hereof). Referring to FIG. 20, the optical isolator according to the U.S. patent is shown comprising an incident-light fiber 212, outgoing-light fiber 228, a birefringent plate 214 held to face the both fibers, a first reversible rotating means 216, a second reversible rotating means 226, a nonreversible rotating means (Faraday rotator) 218, a focusing lens 222, and a concave mirror 224. (For its performance refer to the patent.) Under the present invention, a half-wave plate plays the role of both the elements 216 and 222, and the elements 216, 226, and 218 are replaced by a composite optical element of the invention. Alternatively, a composite optical element of the invention may be used in place of the elements 216, 226, and 214. In either case the element 218 or 214 is the third optical material.

With the construction described above, the present invention achieves the following beneficial effects.

(1) Very thin composite optical elements are realized.

(2) Since each birefringent material can be machined to a precisely controlled thickness d, ideal composite optical elements with favorable characteristics, and optical devices utilizing the elements, such as polarizers, optical isolators, circulators, and switches, can be manufactured stably with good reproducibility.

(3) The fact that the refractive indexes of the birefringent materials as the chief constituent members can be precisely measured before fabrication facilitates the designing of a composite optical element and an optical device utilizing the same and simplifies the control of their optical path lengths.

(4) The use of a birefringent material with excellent environmental resistance as a chief constituent member causes little deterioration with time in the performance of the composite optical element and the optical device using the same.

(5) In the case of an optical isolator, a very thin isolator with no polarization dispersion or dependence on polarization can be obtained.

What we claim is:

1. A composite optical element comprising a first optical material and a second optical material joined to one plane of a third optical material, the first and second optical materials being the same in thickness and having on each side of the first and second optical materials a single ground principal planar surface including portions of the first and second optical materials, both of said ground principal planar surfaces having been generated by grinding the surfaces of the first and second optical materials in mutually fixed condition.

2. An element according to claim 1, wherein one of the first optical material and the second optical material is a birefringent material.

3. An element according to claim 1, wherein both the first optical material and the second optical material are birefringent.

4. A composite optical element according to claim 1 characterized in that the first optical material and the second optical material have functions as wave plates.

5. An optical isolator using a composite optical element according to claim 4.

6. An optical circulator using a composite optical element according to claim 4.

7. An optical switch using a composite optical element according to claim 4.

8. A composite optical element comprising a Faraday rotator having a Faraday rotation angle of approximately 45°, first and second birefringent materials joined to one side of the rotator, and third and fourth birefringent materials joined to the other side of the rotator, and wherein:

the light that has been transmitted through the first birefringent material passes through the third birefringent material;

the light that has been transmitted through the second birefringent material passes through the fourth birefringent material;

the optical axis of the first birefringent material and that of the second birefringent material intersect orthogonally;

the optical axis of the third birefringent material and that of the fourth birefringent material intersect orthogonally;

the optical axis of the first birefringent material and that of the third birefringent material make an angle of about 45° with respect to each other;

the first and second birefringent materials have on each side of the first and second optical materials a single ground principal plane including portions of the first and the second birefringent materials both of said ground principal planes having been generated by grinding the surfaces of the first and second birefringent materials in mutually fixed condition;

the third and fourth birefringent materials have on each side of the third and fourth optical materials a single ground principal plane including portions of the third and fourth birefringent materials, both of said ground principal planes having been generated by grinding the surfaces of the third and fourth birefringent materials in mutually fixed condition;

the first, second, third, and fourth birefringent materials are of the same material and have approximately the same thickness d, substantially satisfying the equation $$2(no-ne)d=(M+1/2)\lambda$$

where no is the refractive index of the birefringent material to ordinary light, ne is the refractive index of the birefringent material to extraordinary light, M is an arbitrary integer, and $\lambda$ is the wavelength of the light.

9. A polarization-insensitive optical isolator comprising:
a first optical waveguide, a first lens, a composite optical element defined in claim 8, a second lens, and a second optical waveguide arranged in order such that light emanating in a forward direction from the end of the first optical waveguide is converted by the first lens to parallel beams, first light that has been transmitted through the first birefringent material of the said composite optical element passes through the third birefringent material, second light that has been transmitted through the second birefringent material passes through the fourth birefringent material, and, after the passage through the third and fourth birefringent materials, the first light and second light, which have experienced no optical path difference regardless of polarization, are combined by the second lens into the second optical waveguide;

while light emanating in the reverse direction from the end of the second optical waveguide is converted by the second lens to parallel beams, third light that has been transmitted through the third birefringent material passes through the first birefringent material, fourth light that has been transmitted through the fourth birefringent material passes through the second birefringent material, and, after the passage through the first and second birefringent materials, the third light and fourth light experience a half-wave optical path difference regardless of polarization and are not combined by the first lens into the first optical waveguide.

10. An isolator according to claim 9, wherein the first and second optical waveguides are optical fibers.

11. A polarization-insensitive optical isolator which comprises:

a composite optical element according to claim 8 inserted between a first single-mode optical waveguide and a second single-mode optical waveguide; and wherein out of the light rays outgoing in the forward direction from the end of the first single-mode optical waveguide, first that been transmitted through the first birefringent through the third birefringent material, second ray that been transmitted through the second birefringent material pass through the fourth birefringent material, and, after the passage through the third and fourth birefringent materials, the first and second rays, exhibit no optical path difference regardless of polarization, and are combined into the second single-mode optical waveguide;

while, out of the rays outgoing in the reverse direction from the end of the second single-mode optical waveguide, third rays that been transmitted through the third birefringent material through the first birefringent material, fourth rays that have been transmitted through the fourth birefringent material pass through the second birefringent material and, after the passage through the first and second birefringent materials, the third and fourth rays exhibit a half-wave optical path difference regardless of polarization and are not combined into the first single-mode optical waveguide.

12. An isolator according to claim 11, wherein the first and second single-mode optical waveguides are optical fibers whose cores are enlarged in the regions at and close to the ends thereof.

13. An optical circulator based on a waveguide type Mach-Zehnder interferometer circuit which comprises two optical waveguides for input and output, two 3-dB directional couplers, and two optical paths of equal length held between the two directional couplers, comprising:

a composite optical element according to claim 8 inserted between the two optical paths;

first and third birefringent material regions being located in one of the optical paths and second and fourth birefringent material regions in the other optical path.

* * * * *